(12) United States Patent
Jeong et al.

(10) Patent No.: US 9,052,543 B2
(45) Date of Patent: Jun. 9, 2015

(54) LIQUID CRYSTAL DISPLAY

(75) Inventors: Young-Hun Jeong, Gumi (KR);
Hyeuk-Chan Kwon, Jung-Ri (KR);
Ju-Hun Min, Dongsan-Ri (KR);
Chang-Yul Moon, Suwon (KR);
Sun-Woong Kim, Seoul (KR)

(73) Assignee: LG DISPLAY CO. LTD., Seoul (KR)

( * ) Notice: Subject to any disclaimer, the term of this patent is extended or adjusted under 35 U.S.C. 154(b) by 188 days.

(21) Appl. No.: 12/622,057

(22) Filed: Nov. 19, 2009

(65) Prior Publication Data
US 2010/0165247 A1 Jul. 1, 2010

(30) Foreign Application Priority Data

Dec. 26, 2008 (KR) .................. 10-2008-0135007

(51) Int. Cl.
*G02F 1/1335* (2006.01)
(52) U.S. Cl.
CPC .... *G02F 1/133606* (2013.01); *G02F 1/133604* (2013.01)
(58) Field of Classification Search
CPC .............. G02F 1/133606; G02F 2001/133607; G02B 6/0025; G02B 6/0031; G02B 6/005; G02B 6/0051; G02B 6/0055
USPC ................... 349/64, 62; 362/609, 616
See application file for complete search history.

(56) References Cited

U.S. PATENT DOCUMENTS

| | | | | |
|---|---|---|---|---|
| 7,399,995 B2* | 7/2008 | Yu | | 257/98 |
| 7,611,262 B2* | 11/2009 | Chang | | 362/246 |
| 7,864,266 B2* | 1/2011 | Lee et al. | | 349/64 |
| 8,040,461 B2* | 10/2011 | Lin et al. | | 349/64 |
| 2006/0152651 A1* | 7/2006 | Negley et al. | | 349/64 |
| 2007/0035948 A1* | 2/2007 | Liao | | 362/245 |
| 2007/0051960 A1* | 3/2007 | Yu | | 257/88 |
| 2008/0043455 A1* | 2/2008 | Chang | | 362/29 |
| 2008/0129931 A1* | 6/2008 | Takahashi et al. | | 349/96 |
| 2008/0225202 A1* | 9/2008 | Joo et al. | | 349/64 |
| 2009/0128740 A1* | 5/2009 | Lee et al. | | 349/64 |
| 2010/0128464 A1* | 5/2010 | Joo et al. | | 362/97.1 |
| 2010/0214514 A1* | 8/2010 | Lin et al. | | 349/112 |
| 2010/0302479 A1* | 12/2010 | Aronson et al. | | 349/64 |
| 2011/0085110 A1* | 4/2011 | Lin et al. | | 349/64 |

FOREIGN PATENT DOCUMENTS

CN 101093308 A 12/2007
KR 1020070107911 A 11/2007

OTHER PUBLICATIONS

Office Action issued in corresponding Chinese Patent Application No. 200910209336.8, mailed Aug. 1, 2011.
Office Action issued in corresponding Korean Patent Application No. 10-2008-0135007, mailed Feb. 25, 2013.

* cited by examiner

*Primary Examiner* — Jessica M Merlin
(74) *Attorney, Agent, or Firm* — Brinks Gilson & Lione

(57) ABSTRACT

A liquid crystal display (LCD) device includes: a liquid crystal panel; a plurality of lamps disposed under the liquid crystal panel, supplying light to the liquid crystal panel; a diffusion plate disposed above the lamps and diffusing light emitted from the lamps; a diffusion sheet disposed on the diffusion plate and including a plurality of reflection patterns formed on a region of a rear surface adjacent to the lamps and including reflection beads reflecting a portion of light from the diffusion plate, wherein the respective reflection patterns of the diffusion sheet are formed to extend in a direction parallel to a lengthwise direction of the lamps.

13 Claims, 4 Drawing Sheets

LIQUID CRYSTAL DISPLAY

This application claims the benefit of Korea Patent Application No. 10-2008-0135007, filed on Dec. 6, 2008, the entire contents of which is incorporated herein by reference for all purposes as if fully set forth herein.

BACKGROUND

1. Field of the Invention

The present disclosure relates to a liquid crystal display (LCD) device and, more particularly, to an LCD device capable of improving luminance uniformity of light supplied to a liquid crystal panel to thus improve screen display quality, and minimizing the number of optical sheets provided for the purpose of improving uniformity of light.

2. Discussion of the Related Art

In general, the application coverage of a liquid crystal display (LCD) extends because of its characteristics that it is lighter, thinner, and driven at a low power consumption. Thus, the LCD is commonly used as a means for displaying images in mobile computers, mobile phones, office automation equipment, or the like.

The LCD displays a desired image on its screen by controlling the amount of transmission of light according to a video signal applied to a plurality of control switching elements arranged in a matrix form.

The LCD includes a liquid crystal panel including a color filter substrate, an upper substrate, and a thin film transistor (TFT) substrate, a lower substrate, which face, between which and a liquid crystal layer is formed, and a driver that supplies a scan signal and image information to the liquid crystal panel to operate the liquid crystal panel.

The LCD is not a self-emissive display device which does not emit light by itself, so it requires a light source for providing light to the liquid crystal panel. Thus, the LCD includes a backlight assembly including a light source to supply light to the liquid crystal panel.

The general LCD will now be described with reference to the accompanying drawings.

As shown in FIG. 1, the general LCD includes a liquid crystal panel 1, a plurality of lamps 2 disposed under the liquid crystal panel and supplying light to the liquid crystal panel 1, a diffusion plate 3 for diffusing light emitted from the lamps 2, a diffusion sheet 4 disposed on the diffusion plate 3 and diffusing light emitted from the diffusion plate 3, a prism sheet 7 disposed on the diffusion sheet 4 and collecting light emitted from the diffusion sheet 4, a protection sheet 8 disposed on the prism sheet 7 to protect to prism sheet 7, and a reflection sheet 9 disposed below the lamps 2 and reflecting light emitted from the lamps 2 toward the diffusion plate 3.

In the LCD device with such configuration, in order to meet the users' rising expectations of a slim model, the distance L1 between the lamps 2 and the diffusion plate 3 is decreasing, and the number of lamps 2 is reduced because of high efficiency of the lamps 2 themselves, increasing the distance L2 between the lamps 2, and accordingly, uniformity of light supplied to the liquid crystal panel 1 is degraded. Thus, in order to solve this problem, a plurality of diffusion sheets need to be further provided to enhance the uniformity of light, which, however, runs counter the consumers' expectations of the slim model.

BRIEF SUMMARY

This specification provides a liquid crystal display (LCD) device including: a liquid crystal panel; a plurality of lamps disposed under the liquid crystal panel, supplying light to the liquid crystal panel; a diffusion plate disposed above the lamps and diffusing light emitted from the lamps; a diffusion sheet disposed on the diffusion plate and including a plurality of reflection patterns formed on a region of a rear surface adjacent to the lamps and including reflection beads reflecting a portion of light from the diffusion plate, wherein the respective reflection patterns of the diffusion sheet are formed to extend in a direction parallel to a lengthwise direction of the lamps.

BRIEF DESCRIPTION OF THE DRAWINGS

FIGS. 6a and 6b illustrate luminance distribution of the diffusion sheet when a diffusion plate and the diffusion sheet are sequentially disposed on lamps an the lamp is driven in FIG. 2, wherein FIG. 6a is a plan view showing a luminance measurement point; and FIG. 6b is a graph of luminance data at the luminance measurement point of FIG. 6a.

DETAILED DESCRIPTION OF THE DRAWINGS AND THE PRESENTLY PREFERRED EMBODIMENTS

A liquid crystal display (LCD) device according to embodiments of the present invention will now be described in detail with reference to the accompanying drawings.

Figure 2:
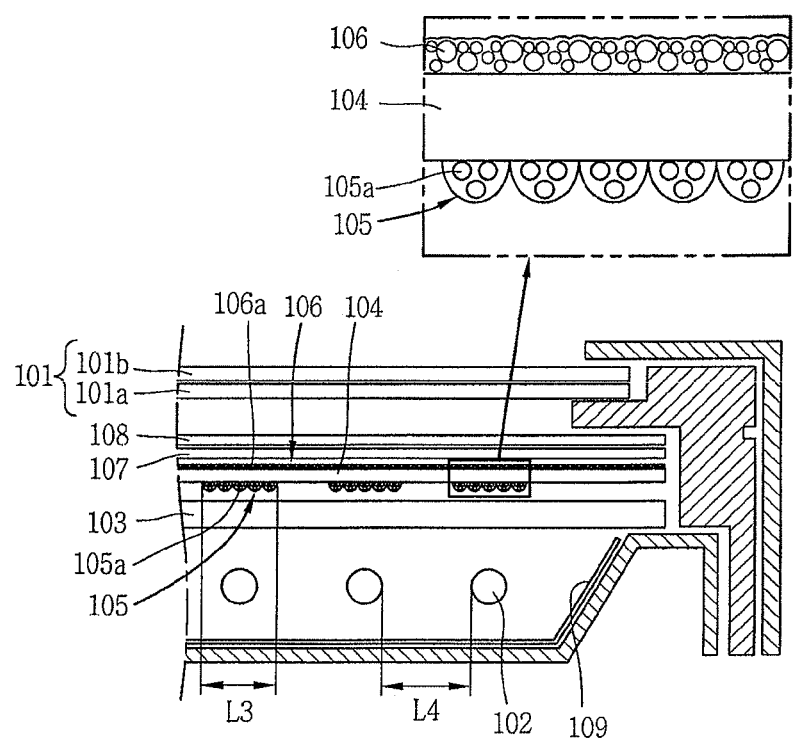
FIG. 2 is a sectional view illustrating an LCD device according to an embodiment of the present disclosure.

As shown in FIG. 2, the LCD device according to an embodiment of the present invention includes: a liquid crystal panel 101; a plurality of lamps 102 disposed under the liquid crystal panel 101, supplying light to the liquid crystal panel 101; a diffusion plate 103 disposed above the lamps 102 and diffusing light emitted from the lamps 102; a diffusion sheet 104 disposed on the diffusion plate 103 and including a plurality of reflection patterns 105 formed on a region of a rear surface adjacent to the lamps 102 and including reflection beads 105a reflecting a portion of light from the diffusion plate 103. The respective reflection patterns 105 of the diffusion sheet 104 extend in a direction parallel to a lengthwise direction of the lamps 102.

The elements of the LCD device with such configuration according to the embodiment of the present invention will now be described.

With reference to FIG. 2, the liquid crystal panel 101 includes a color filter substrate 101a, an upper substrate, and a thin film transistor (TFT) array substrate 101b, a lower substrate. A liquid crystal layer (not shown) is formed between the two substrates 101a and 101b.

A plurality of lamps 102 are provided below the liquid crystal panel 101, and the liquid crystal panel 101 displays screen images upon receiving light from the lamp 102.

The lamp 102 may include an EEFL (External Electrode Fluorescent Lamp), a CCFL (Cold Cathode Fluorescent lamp), or the like.

With reference to FIG. 2, a diffusion plate 103 is disposed above the lamps 102 to diffuse light from the lamp 102 and supply the same to the diffusion sheet 104.

The diffusion 104 is disposed at an upper portion of the diffusion plate 103 to change light from the diffusion plate 103 into surface light source of uniform luminance distribution.

A plurality of reflection patterns 105 including reflection beads 105a for reflecting a portion of light from the diffusion plate 103 are formed on regions of a rear surface of the diffusion sheet 104 near the lamps 102. Each reflection pattern 105 is formed to extend to be parallel to a lengthwise direction of the lamps 102. The characteristics of the diffusion sheet 104 will be described in detail later.

A prism sheet 107 may be disposed at an upper portion of the diffusion sheet 104 to collect light from the diffusion sheet 104, and a protection sheet 108 may be disposed on the prism sheet 107 to protect the prism sheet 107. The prism sheet 107 and the protection sheet 108 may be omitted if light collecting patterns (206 in FIG. 4) are formed on the diffusion sheet 104. This will be described in detail later.

A reflection sheet 109 is formed below the plurality of lamps. The reflection sheet 109 reflects light emitted from the lamps 102 to the interior of the diffusion plate 103.

The diffusion sheet 104 will now be described in detail with reference to FIGS. 2 to 6b.

With reference to FIG. 2, the plurality of reflection patterns 105 are formed to extend in a bar shape in the direction parallel to the lengthwise direction of the lamps 102 on the rear surface of the diffusion sheet 104.

Figure 3:
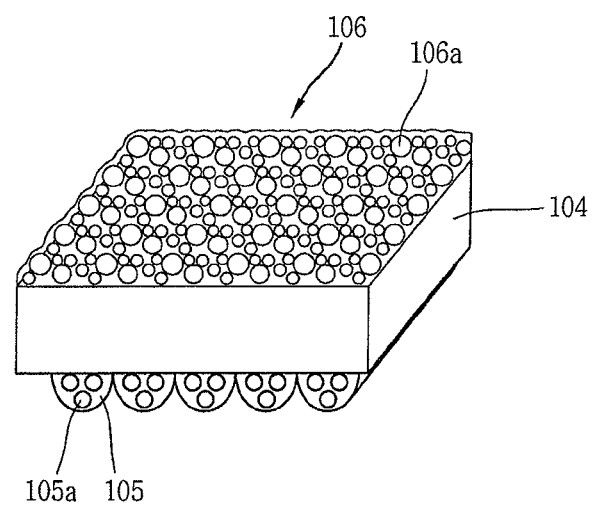
FIG. 3 is an enlarged perspective view of a diffusion sheet of FIG. 2.

FIGS. 2 and 3 show the reflection patterns 105 formed to have a shape of a lenticular lens on the rear surface of the diffusion sheet 104, but the present invention is not limited thereto and the reflection patterns 105 may have various other shapes such as a prism-like shape, an n-angular column-like shape, or the like, without departing from the scope of the invention. Here, 'n' is a natural number of 4 or larger.

In describing the present invention, the reflection patterns 105 formed on the rear surface of the diffusion sheet 104 have the bar shape extending in the direction parallel to the lengthwise direction of the lamps 102, but the present invention is not limited thereto and may have a micro-lens shape or any other shapes within the scope of the present invention.

Several reflection patterns 105 of the diffusion sheet 104 are formed to correspond to each lamp 102, making a group for each corresponding lamp 102, and the plurality of reflection patterns 105 included in each group of the reflection patterns 105 are formed to have the same distribution at both sides based on the center of each corresponding lamp 102.

With reference to FIG. 2, the width (L3) of each group of the reflection patterns 105 may be about one-fourth to about three-fourths of the interval (L4) between the lamps. The width of a single reflection pattern 105 may be within the range of about 50 μm to about 300 μm.

The reflection beads 105a included in the reflection patterns 105 of the diffusion sheet 104 include a plurality of air balls therein or have a reflection material coated thereon. The reflection beads 105a, which are formed within the reflection patterns 105 formed at regions adjacent to the lamps 102 on the rear surface of the diffusion sheet 104, reflect a portion of light of high luminance in adjacent to the lamps 102 to make the portion of light to proceed toward the reflection sheet 109. After being reflected from the reflection sheet 109, the light proceeds toward regions not adjacent to the lamps 102 of the rear surface of the diffusion sheet 104, namely, the regions where the reflection patterns 105 are not formed, whereby the light, which has passed through the diffusion sheet 104, has a uniform distribution overall.

The density of the reflection beads 105a included in the reflection pattern 105 of the diffusion sheet 104 may be within the range of about 20% to about 80%.

With reference to FIG. 2, in the reflection patterns 105 of the diffusion sheet 104, other regions than the reflection beads 105a are made of a UV thermosetting acryl resin.

As shown in FIG. 2, the diffusion layer 106 including a plurality of diffusion beads 106a is formed on the diffusion sheet 104. The diffusion layer 106 may has a haze value ranging from about 50% to about 99%. The diffusion beads 106a may be made of one of materials selection from among PMMA (polymethylmethacrylate), PC (polycarbonate), and silica.

In FIGS. 2 and 3, the diffusion layer 160 includes the plurality of diffusion beads 106a and is formed on the upper surface of the diffusion sheet 104, but the present invention is not limited thereto and the plurality of light collecting patterns (206 in FIG. 4) may be formed on the diffusion sheet (204 in FIG. 4), and any modifications may be possible without departing from the scope of the present invention.

Namely, the light collecting patterns (206 in FIG. 4) having the prism-like shape are formed on the upper surface of the diffusion sheet (204 in FIG. 4), or although not shown, light collecting patterns may be formed in one selected from among the shapes of lenticular lens, the n-angular column, and micro-lens. In this case, the light collecting patterns 206 may be made of an acryl resin with a refractive index of about 1.4 to about 1.7, and the width (L6) of one light collecting pattern 206 may range from about 20 μm to about 200 μm.

When the light collecting patterns 206 are formed on the upper surface of the diffusion sheet 204, light collecting is made by the light collecting patterns 106, so the prism sheet (107 in FIG. 2) may be omitted.

Figure 4:
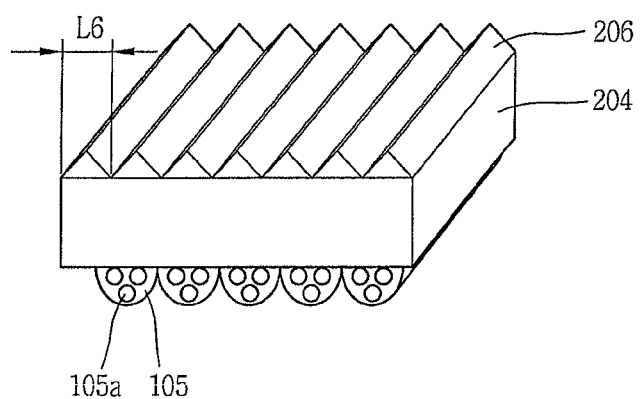
FIG. 4 is a perspective view of a light collecting pattern formed on an upper surface of the diffusion sheet of FIG. 2.
Figure 5:
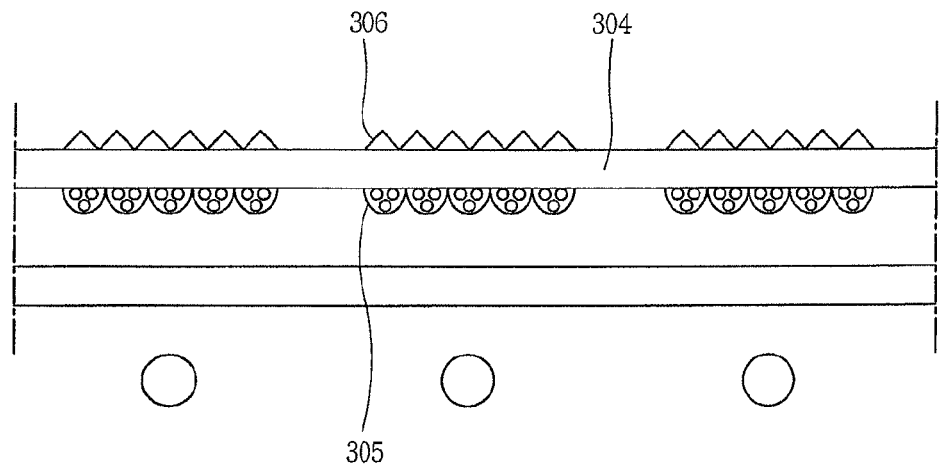
FIG. 5 is a sectional view of another example of the light collecting pattern of FIG. 4.

In FIG. 4, the light collecting patterns 206 are formed on the entire surface of the diffusion sheet 204, but the present invention is not limited thereto. That is, as shown in FIG. 5, the light collecting patterns may be formed only on the regions overlapping with the reflection patterns 305 formed on the rear surface of the diffusion sheet 304 and various other modifications can be possible within the scope of the present invention.

The effect of the present invention will now be described with reference to FIGS. 6a and 6b.

Figure 1:
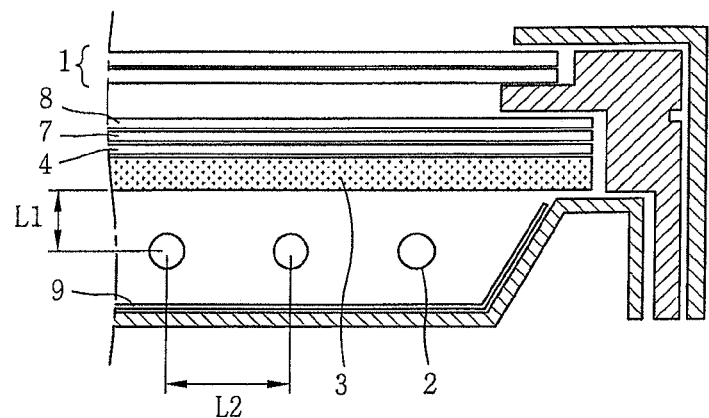
FIG. 1 is a sectional view illustrating a general liquid crystal display (LCD) device.
Figure 6A:
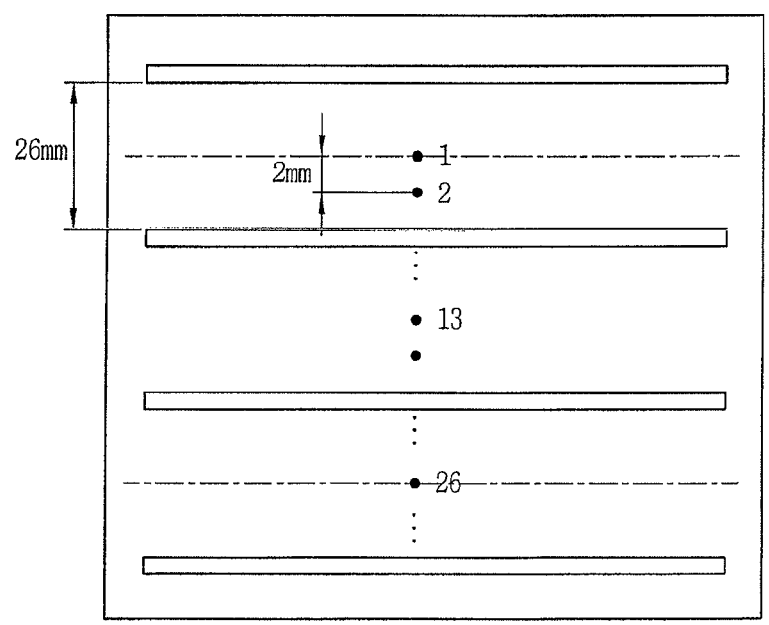
Figure 6B:
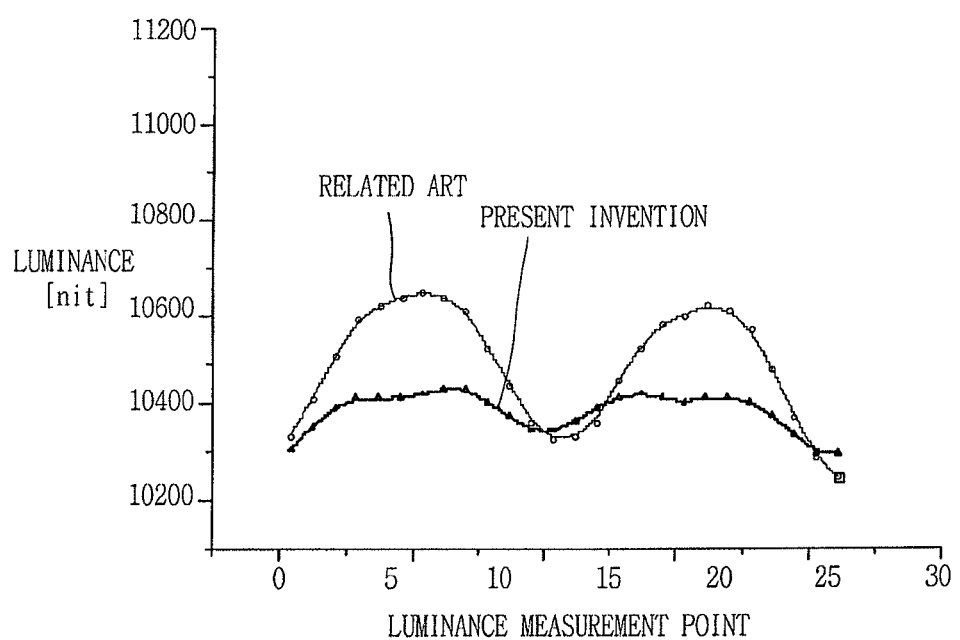

FIGS. 6a and 6b illustrate luminance distribution of the diffusion sheet 104 when the lamps 102 are driven after the diffusion plate 103 and the diffusion sheet 104 are disposed at the upper portion of the lamps 102. Specifically, FIG. 6a is a plan view showing the lamps 102 disposed at intervals of 26 mm and luminance measurement points (26 points) of intervals of 2 mm, and FIG. 6b is a graph of luminance data at the luminance measurement points. The graph of FIG. 6b also shows the luminance distribution of the protection sheet 8 when the lamps 2 are driven after the diffusion plate 3, the diffusion sheets 4, the prism sheet 7, and the protection sheet 8 are disposed at the upper portion of the lamps 2 in the related art LCD as shown in FIG. 1.

With reference to FIGS. 6a and 6b, as for the luminance data of the LCD according to the present invention and that of the general LCD, luminance data of the region adjacent to the lamps have a relatively high luminance, and compared to the related art general LCD, the LCD according to the present invention has the characteristics that there is not much deviation between the luminance data of the region adjacent to the lamps 102 and luminance data of regions not adjacent to the lamps 102, so the luminance uniformity is high.

As so far described, the LCD according to the embodiment of the present invention has the advantages that because the reflection patterns 105 are formed at the regions adjacent to the lamps 102 on the rear surface of the diffusion sheet 104, surface light source having a uniform luminance distribution can be provided to the liquid crystal panel 101.

Therefore, the screen display quality of the LCD device can be improved, and the number of optical sheets can be minimized.

As the present invention may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

The invention claimed is:

1. A liquid crystal display (LCD) device comprising:
    a liquid crystal panel;
    a plurality of lamps under the liquid crystal panel, supplying light to the liquid crystal panel;
    a diffusion plate above the lamps and diffusing light emitted from the lamps;
    a reflection sheet below the lamps;
    a diffusion sheet on the diffusion plate;
    a plurality of reflection patterns on regions of a rear surface of the diffusion sheet adjacent to the lamps and including reflection beads reflecting a portion of light from the diffusion plate, the plurality of reflection patterns formed in a plurality of groups that correspond to the plurality of lamps with a gap between adjacent groups, the reflection patterns within each group being in direct contact with one another; and
    a plurality of light collecting patterns on an upper surface of the diffusion sheet to collect a portion of light from the reflection patterns, wherein the light collecting patterns are disposed in a plurality of groups with a gap between adjacent groups of the light collecting patterns, and the light collecting patterns within each group being in direct contact with one another;
    wherein the respective reflection patterns of the diffusion sheet extend in a direction parallel to a lengthwise direction of the lamps;
    wherein the reflection beads reflect a portion of light onto the reflection sheet which reflects the portion of light onto regions where the reflection patterns are not disposed on the diffusion sheet; and
    wherein the reflection beads included in the reflection patterns of the diffusion sheet include a plurality of air balls or contain a reflection terminal coated thereon.

2. The device of claim 1, wherein the plurality of reflection patterns on the rear surface of the diffusion sheet corresponds to the plurality of lamps, each group among the reflection patterns corresponding to a respective lamp among the lamps and the plurality of reflection patterns included in each group of the reflection patterns are disposed to have the same distribution at both sides based on the center of each corresponding lamp.

3. The device of claim 2, wherein the width of each group of the reflection patterns is about one-fourth to about three-fourths of the interval between the lamps.

4. The device of claim 1, wherein the reflection patterns have a shape selected from the shapes of a lenticular lens, a prism, an n-angular column (n is a natural number of 4 or larger).

5. The device of claim 1, wherein the width of each reflection pattern is within the range of about 50 μm to about 300 μm.

6. The device of claim 1, wherein the density of the reflection beads included in the reflection pattern of the diffusion sheet ranges from about 20% to about 80%.

7. The device of claim 1, wherein the other regions, excluding the reflection beads, of the reflection patterns of the diffusion sheet are made of a UV thermosetting acryl resin.

8. The device of claim 7, wherein a diffusion layer on the diffusion sheet has a haze value ranging from about 50% to about 99%.

9. The device of claim 1, wherein the reflection beads are made of one selected from among PMMA (polymethylmethacrylate), PC (polycarbonate), and silica.

10. The device of claim 1, wherein the light collecting patterns have a shape selected from among a lenticular lens, a prism, an n-angular column and a micro-lens.

11. The device of claim 1, wherein the light collecting patterns are made of an acryl resin having a refractive index of about 1.4 to about 1.7.

12. The device of claim 1, wherein the width of each of the plurality of light collecting patterns ranges from 20 μm to 200 μm.

13. The device of claim 1, wherein the groups of light collecting patterns are disposed at regions corresponding to respective groups of reflection patterns.

* * * * *